W. S. MITCHELL.
AUTOMATIC MOTOR CONTROL.
APPLICATION FILED APR. 17, 1912.

1,106,469.

Patented Aug. 11, 1914.
3 SHEETS—SHEET 1.

Witnesses:
Josephine H. Ryan
Charles J. Woodbury

Inventor:
William S. Mitchell.
By Roberts Roberts & Cushman.
Attorneys

W. S. MITCHELL.
AUTOMATIC MOTOR CONTROL.
APPLICATION FILED APR. 17, 1912.
1,106,469.
Patented Aug. 11, 1914.
3 SHEETS—SHEET 2.
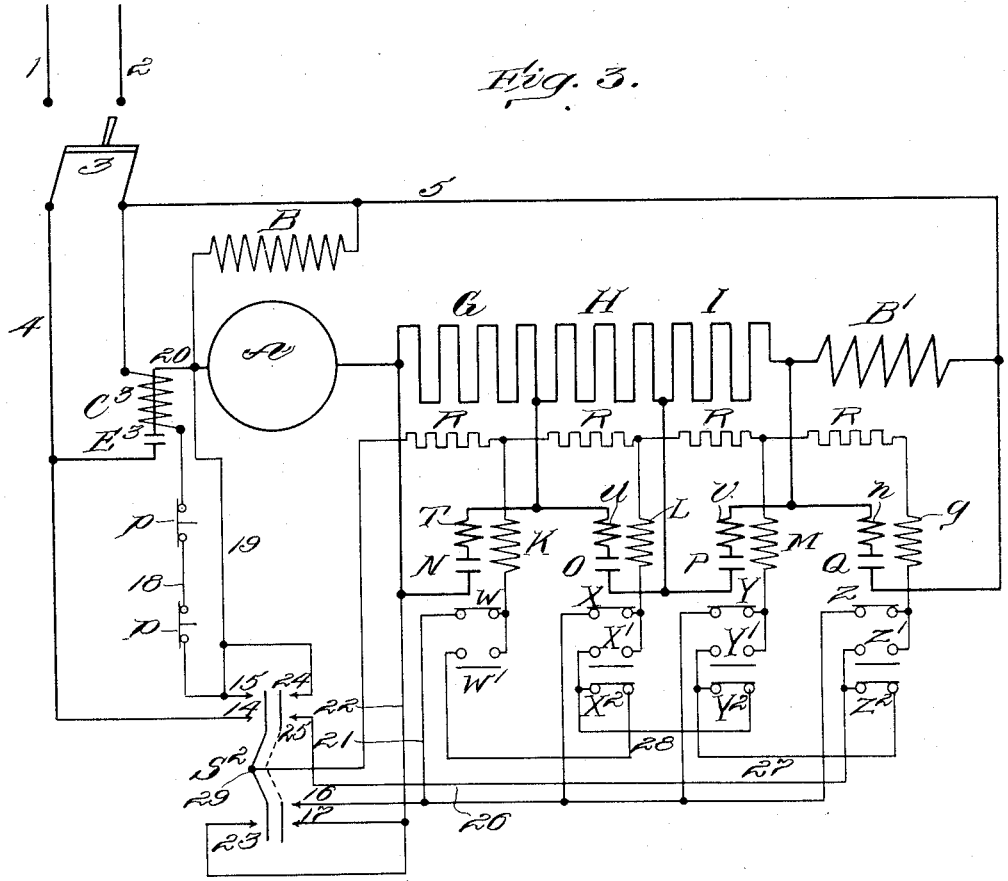
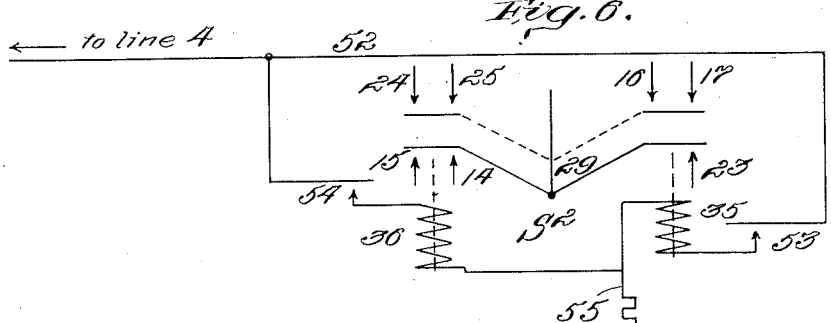

UNITED STATES PATENT OFFICE.

WILLIAM S. MITCHELL, OF SOMERVILLE, MASSACHUSETTS, ASSIGNOR OF ONE-THIRD TO JOSEPH W. SMITH, OF PATERSON, NEW JERSEY.

AUTOMATIC MOTOR CONTROL.

1,106,469.  Specification of Letters Patent.  Patented Aug. 11, 1914.

Application filed April 17, 1912. Serial No. 691,409.

*To all whom it may concern:*

Be it known that I, WILLIAM S. MITCHELL, a citizen of the United States, and resident of Somerville, in the county of Middlesex and State of Massachusetts, have invented new and useful Improvements in Automatic Motor Control, of which the following is a specification.

This invention relates to automatic motor controls, and its object is to provide novel and improved systems of acceleration and deceleration of motors, as hereinafter more fully described and pointed out in the claims.

Figure 1:
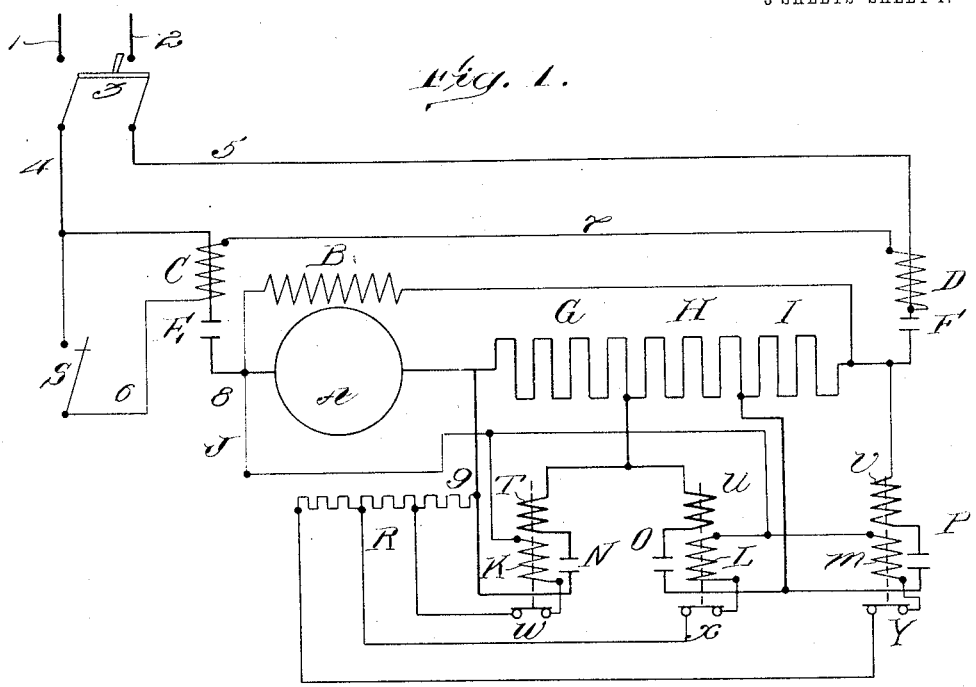
Figure 2:
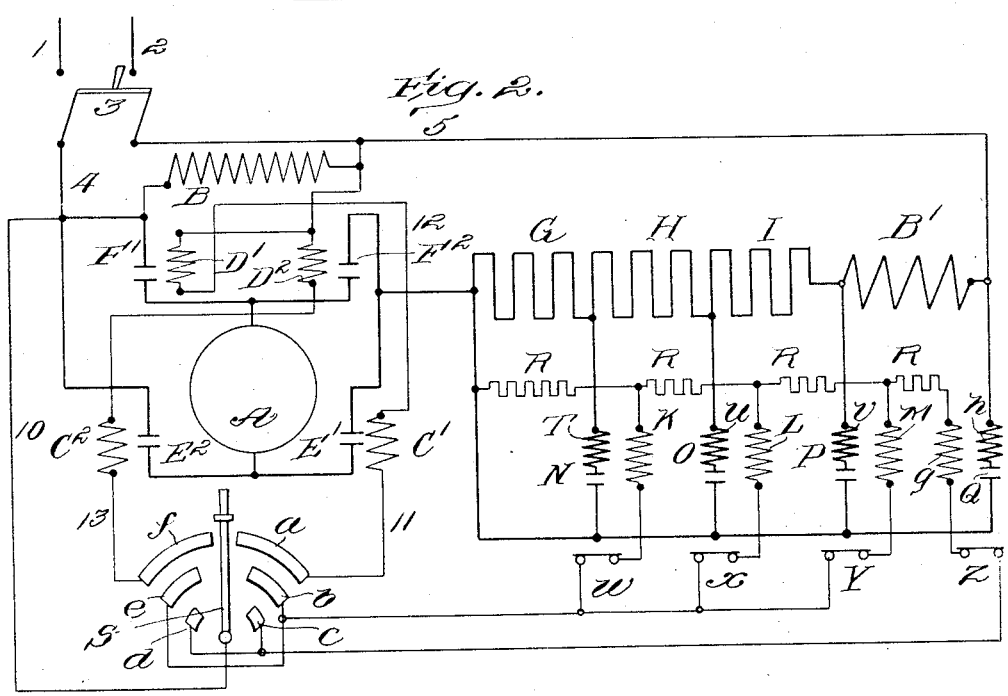
Figure 4:
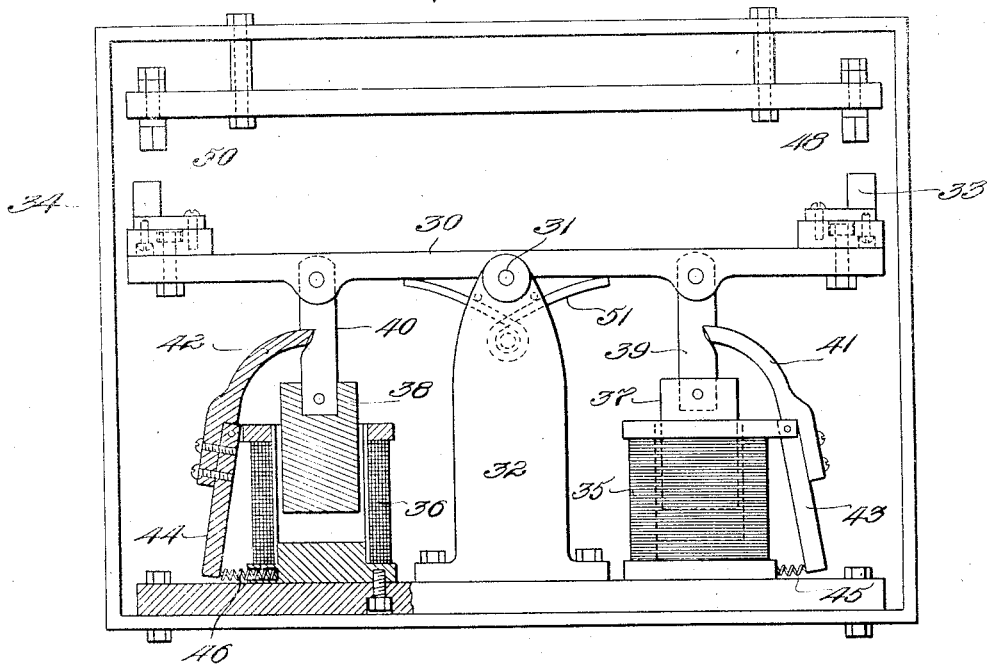
Figure 5:
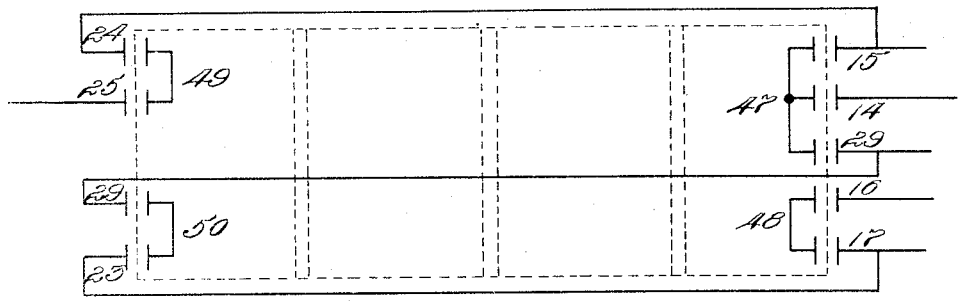

In the drawings hereto annexed which illustrate diagrammatically certain adaptations of the invention,—Figure 1 illustrates an automatic accelerating device containing my invention, for a direct current, shunt wound motor, having a single running point or speed; Fig. 2 illustrates an automatic accelerating device containing my invention for a compound wound, reversible motor having three running points; Fig. 3 illustrates an automatic accelerating and a decelerating device, containing my invention, for a compound wound motor; Fig. 4 shows in side elevation a magnetically operated control switch suitable for the accelerating and decelerating system of Fig. 3; Fig. 5 is a diagrammatic view illustrating the arrangement of the contacts and wiring of said switch; and Fig. 6 is a diagrammatic illustration of the wiring of such switch.

The device illustrated in Fig. 1 is applicable to situations where it is desired upon closing the control switch of the motor, either automatically or by hand, to start the motor, permit it to accelerate to full speed, and to stop it by opening the control switch. This arrangement is adaptable to such purposes as the starting of a motor on a pump by a float switch; or on an air compressor where the control switch is automatically closed by low pressure in an air reservoir and opened at high pressure; or wherever it is desired merely to start and stop a motor, which runs in one direction, by simply closing and opening the control switch.

Referring to Fig. 1 of the drawings, A represents the armature of the motor, and B the shunt field. Current is supplied from the main line conductors 1 and 2, which are connected by switch 3 with conductors 4 and 5, respectively. By closing the main control switch S, magnet coils C and D will be energized, the circuit thereof being closed from conductor 4 through conductors 6 and 7 to conductor 5. The energizing of magnets C and D closes switches E and F and completes the circuit through the armature A and its starting or controlling resistance, G, H, I, and through the shunt field B. When the motor starts, all the sections G, H, I, of the starting resistance will be in the armature circuit. As the motor speeds up it will generate counter electromotive force through the control circuit, which is connected at its ends with the armature circuit at opposite sides of the armature. Said control circuit comprises the conductor J, from which conductors lead in parallel to operating coils K, L and M of electromagnets N, O and P, thence through the normally closed interlocks W, X, Y, to different points on the control circuit resistance R, which is connected to the motor circuit. Each electromagnet N, O, P, has, in addition to said operating coils, the holding coils T, U and V in a circuit which when closed cuts out or short circuits the starting resistance G, H, I. When the counter electromotive force generated through the control circuit is sufficient, owing to the difference of potential between points 8 and 9, to energize the lifting or operating coil K and close the switch of electromagnet N, the armature circuit will be closed through holding coil T, thereby cutting out section G of the starting resistance, and sending current through coil T in preference to the high resistance of section G of the starting resistance. As soon as the switch at N makes contact and coil T is energized, coil T will finish the work of lifting the magnet core, and will effect and maintain a firm closure of the switch. At the same instant coil T will open the interlock W thereby breaking the control circuit through the operating coil K. As the motor further accelerates, and the counter electromotive force becomes sufficient to energize operating coils L and M successively, the switches at O and P will close in the same manner, at the points in the acceleration of the motor predetermined by the extent of the control circuit resistance R in circuit with coils L and M. When coil L is energized the switch at O will be closed, sections G and H of the starting resistance will be cut out, and holding coil U will be energized, as already described with reference to coil T, to create and hold a firm closure of the switch of magnet O, and open the control circuit by opening interlock X. And similarly, when coil M is energized it will close the switch at P, cut out all the starting resistances, energize holding coil V and open interlock Y. Thus it will be seen that at full speed or running point, the holding coils T, U and V are in series in the armature circuit, the operating or lifting coils K, L, M, are all open circuited, and the control circuit resistance R is also open circuited. The motor is stopped by opening main control switch S, whereupon the switches of magnets N, O, P, will all resume their normal or open circuit positions (by gravity or by springs) interlocks W, X and Y will also resume their normal or closed positions, and switches E and F will also open, all ready for another operation as described, upon closing switch S.

Referring now to Fig. 2, I have illustrated the invention applied to the automatic acceleration in either direction of a compound wound motor with a number of running points or speeds. These running points are herein shown for the purpose of illustration. Assuming the main line switch 3 to be closed, if it is desired to start the motor forward, the control switch S' is thrown to the right until contact is made with segment $a$. Current then passes from conductor 4, through conductor 10, switch arm S', contact segment $a$, conductor 11, electromagnet C', conductor 12, electromagnet D', and thence to conductor 5. Electromagnets C' and D' respectively close switches E' and F' and send the current from 4 through armature A, the starting or controlling resistance G, H, I, and series field B' to conductor 5, starting the motor with all the starting resistance and both the series field B' and the shunt field B in circuit. In the position thus far assumed the control circuit is not in action. By moving the switch arm S' farther to the right until it makes contact with segment $b$ the control circuit is closed through conductor 10, which connects with the armature circuit at one side of the armature, through operating coils K, L and M, and resistance R, which connects with the armature circuit at the other side of the armature. As operating coils K, L and M are successively energized they successively close the switches of electromagnets N, O and P, thereby energizing holding coils T, U and V and opening interlocks W, X and Y in succession, all as heretofore described. After the full motor speed has been attained, the switch arm S' may be swung into contact with segment $c$, thereby closing the control circuit through operating coil $g$ of electromagnet Q, closing the switch of that magnet, short-circuiting the series field B', energizing holding coil $h$ and opening interlock Z. If at the start the switch arm S' is moved at once into contact with all three segments, $a$, $b$ and $c$, the control will automatically accelerate the motor to full speed, the starting resistance G, H, I, being cut out step by step, and finally the series field B' being automatically cut out. If it be desired to reverse the motor the switch arm is moved to the left making contact with segment $f$ and completing the circuit from conductor 4, through conductor 10, switch S', segment $f$, conductor 13, magnet $C^2$, which closes switch $E^2$, magnet $D^2$, which closes switch $F^2$, and thence to conductor 5, thereby sending current through armature A in reverse direction. In other respects the action of the device is the same as when the motor is being operated forward.

Fig. 3 illustrates an adaptation of my invention to the automatic acceleration of the motor to any point, and the deceleration of the motor to any point, the motor herein shown being adapted to run in one direction. By operating control switch $S^2$ so as to close connection between contacts 14 and 15, and point 29 of switch $S^2$, and between contacts 16 and 17, a circuit will be closed from conductor 4, through contacts 14 and 15, conductor 18, in which may be any desired number of stop push buttons $p$, electromagnet $C^3$, and thence to conductor 5. The energizing of magnet $C^3$ closes switch $E^3$; thereby closing the circuit through armature A, starting or controlling resistance G, H, I, series field B', and shunt field B. If the control switch $S^2$ is allowed to come to open position as soon as magnet switch $E^3$ is closed, the motor will continue to run at the speed of that point, with the entire starting resistance and the series field in circuit, the magnet coil $C^3$ getting its current to hold switch $E^3$ closed, through conductors 19 and 18, 19 being connected to the armature circuit at 20, and thence to conductor 4 through closed switch $E^3$. If the control switch $S^2$ be kept closed until sufficient speed is attained to generate the necessary counter electromotive force, current will be passed from line 4 to contact 14, point 29, thence through the first section of control circuit resistance R, operating coil K of electromagnet N, interlock W, conductor 21, contacts 16 and 17, and conductor 22, to the armature circuit at the opposite side of the armature. This will cause the switch of electromagnet N to close, cutting out section G of the starting or controlling resistance, energizing holding coil T of electromagnet N, and opening interlock W to break the controlling circuit through coil K, in the manner already described. If the control switch $S^2$ is still kept closed in the same direction the operating coils L, M and $g$ will act in succession, closing the switches of electromagnets O, P and Q, energizing holding magnets U, V and $h$, and opening interlocks X, Y and Z, all in proper succession at predetermined points as hereinbefore described. The acceleration of the motor may be stopped at any point by opening the control switch $S^2$, and the motor will continue to run at the speed of that point. To lower the speed of the motor the control switch $S^2$ is operated so as to make connection between contact 23 and point 29, and between contacts 24 and 25. It will be noted that when coil T of electromagnet N opens interlock W, it closes interlock W'. Similarly, coil U closes interlock X' and opens interlock $X^2$; coil V closes interlock Y' and opens interlock $Y^2$; and coil $h$ closes interlock Z' and opens interlock $Z^2$. Assuming that the motor is running at full speed with all the switches of electromagnets N, O, P and Q closed, and the control switch $S^2$ in decelerating position, the control circuit is from 19, through contacts 24 and 25, conductor 26, interlock Z', operating coil $g$, resistance R, point 29 of switch $S^2$, contact 23, and conductor 22 to the armature circuit at the opposite side of the armature. This energizes lifting or operating coil $g$ in the opposite direction, that is, in opposition to the current through the holding coil $h$ of magnet Q, killing or counteracting the flux therethrough, and allowing the switch of electromagnet Q to open thereby again cutting series field B' into circuit with its armature. The return of the magnet core of electromagnet Q to normal position, will also close interlock Z, open interlock Z' and close interlock $Z^2$. The current from conductor 26 will thereupon pass through interlock $Z^2$, conductor 27, interlock Y' (which is at this time closed) operating coil M, resistance R, and thence as before, energizing coil M in opposition to coil V, causing the switch of magnet P to open, cutting in section I of the starting or controlling resistance, and restoring the interlocks Y, Y' and $Y^2$ to their original or normal position. Interlock Y' being now open and interlock $Y^2$ closed, the current from 26 passes through interlock $Z^2$, conductor 27, interlock $Y^2$, conductor 28, closed interlock X', coil L, resistance R and thence as before, opening the switch of electromagnet O, and restoring the corresponding interlocks to normal position, as already described with respect to magnet P, and so on through all the electromagnets and their associated switches and interlocks until all the starting resistance is again in circuit with the armature. Thus it will be seen that a decelerating control circuit is provided, controlled by a switch, adapted to energize said operating coils successively in reverse order to that of their accelerating action, and to energize said operating coils in opposition to the current through the holding coils of the several electromagnets, thereby permitting the magnet cores and switches of the several electromagnets successively to return to normal or open position; and that upon the return of each magnet to normal position, the decelerating circuit through the operating coil of that magnet is opened, and the decelerating circuit through the operating coil of the next magnet in order is closed, and so on through the whole set. It will also be observed that when the apparatus is in normal position, before starting, all the main switches of the electromagnets N, O, etc., are open; the decelerating circuit is open at both ends; and that as each such switch closes during the accelerating action, it connects its operating coil to the decelerating circuit, and as each succeeding switch is closed it disconnects the preceding operating coil from the decelerating circuit. Also that when the decelerating circuit is closed through the main control switch $S^2$, the decelerating circuit is established through the operating coil of the last of the electromagnets N, O, etc. which was operated.

In Figs. 4, 5 and 6 I have illustrated a form of magnetically operated control switch ($S^2$ of Fig. 3) for controlling the accelerating and the decelerating circuits. A rocker bar 30 is pivoted at 31 on a suitable standard or support 32, and carries at one end contact pieces 33 which respectively are adapted to close connection between points 15, 14 and 29, and between points 16 and 17 of the accelerating circuit. At the other end of bar 30 are contact pieces 34 which respectively are adapted to close connection between points 24 and 25, and between points 23 and 29, of the accelerating circuit. Two electromagnet coils 35 and 36 actuate the rocker bar 30, to which the magnet cores 37 and 38 are pivotally connected through plungers 39 and 40. Pivoted to the magnet frames are latches 41 and 42 which respectively engage notches in plungers 39 and 40. Latches 41 and 42 are secured to and actuated by magnet pieces 43 and 44, which are normally urged away from the magnet frames by springs 45 and 46, thereby yieldingly holding latches 41 and 42 normally in locked position in the notches of plungers 39 and 40. When one of the coils, for example 36, is energized, latch 42 is withdrawn from its notch, permitting core 38 to draw bar 30 at that end downward, and to swing the other end of bar 30 upward, until the contact pieces on that end close contacts 15, 14 and 29, and contacts 16 and 17, by connections 47 and 48 (Fig. 5) thus establishing the accelerating circuit. Similarly, if magnet coil 35 is energized, latch 41 will be withdrawn and contact pieces 34 will close contacts 24 and 25, and contacts 23 and 29, by connections 49 and 50, thus establishing the decelerating circuit. When the coil 35 or 36, as the case may be, is deenergized, spring 51 will restore the rocker bar 30 to its normal, central position, and any throw by or rebound, which might endanger the accidental closing of the set of contacts at the opposite end of bar 30, will be prevented by the automatic engagement of both spring-pressed latches 41 and 42 when the bar 30 reaches its central position. The coils 35 and 36 are energized by suitable switches or push buttons, and are preferably in circuit with the main lines 4 and 5. As illustrated in Fig. 6, a conductor 52, which is connected to line 4, leads to one end of each of coils 35 and 36, through normally open switches, or push buttons 53 and 54. The other end of each magnet coil is connected through conductor 55, in which there may be a resistance, to line 5. Upon closing either one of said push buttons 53 or 54, the circuit is completed through the corresponding coil, 35 or 36, and control switch $S^2$ is thereby operated, establishing the circuits as already described.

I claim:

1. In combination, a motor having an armature, a resistance in circuit with the armature, and a controller comprising a series of switches adapted to cut out the resistance step by step, each switch being controlled by an electromagnet, and each electromagnet having a switch operating coil, and a switch holding coil, said operating coils being in shunt and said holding coils being in series with the armature, the operating coils being energized successively as the motor speeds up, and said holding coils being brought successively into series with the armature by the action of the operating coils, whereupon the shunt circuits of the respective operating coils are automatically opened.

2. In combination, a motor having an armature, a resistance in circuit with the armature, and a controller comprising a series of switches adapted to cut out the resistance step by step, each switch being controlled by an electromagnet, and each electromagnet having a switch operating coil and a switch holding coil, the operating coils being energized successively as the motor speeds up to operate said switches successively, and said holding coils being energized successively by the operation of said operating coils and being adapted both to open the circuits of the operating coils respectively, and to maintain a firm closure of said switches.

3. In combination, a motor having an armature, a resistance in circuit with the armature, and a controller comprising a series of switches adapted to cut out the resistance step by step, each switch being controlled by an electromagnet, and each electromagnet having a switch operating coil and a switch holding coil and a control-circuit resistance to which the operating coils are so connected as to be energized successively as the motor speeds up to operate said switches successively, said holding coils being energized successively by the operation of the operating coils and being adapted both to open the circuits of the operating coils respectively and to maintain a firm closure of said switches, and said control-circuit resistance being open circuited when the motor is running at full speed.

4. In combination, a motor having an armature, a resistance and a series field in circuit with the armature, and a controller comprising a series of switches adapted to cut out the resistance step by step and finally to cut out the series field, each switch being controlled by an electromagnet, and each electromagnet having a switch operating coil and a switch holding coil, the operating coils being energized successively as the motor speeds up to operate said switches successively, and said holding coils being energized successively by the operation of said operating coils to maintain a firm closure of said switches.

5. In combination, a motor having an armature, a resistance in circuit with the armature, and a controller comprising a series of switches adapted to cut the resistance out or in step by step, each switch being controlled by an electromagnet, and each electromagnet having a switch operating coil and a switch holding coil, the operating coils being energized successively with the acceleration of the motor to operate said switches successively, said holding coils being energized successively by the operation of said operating coils to maintain a firm closure of said switches, and means to energize said operating coils successively in reverse order to that of the accelerating action, and in opposition to the current passing through the holding coils, thereby nullifying the magnetic flux through the holding coils, and allowing said switches to open successively to decelerate the speed of the motor.

6. In combination, a motor having an armature, a resistance in circuit with the armature, and a controller comprising a series of switches adapted to cut the resistances out or in step by step, each switch being controlled by an electromagnet and each electromagnet having a switch operating coil and a switch holding coil, the operating coils being energized successively with the acceleration of the motor to operate said switches successively, said holding coils being energized successively by the operation of said operating coils to maintain a firm closure of said switches, and means to decelerate the speed of the motor, comprising a decelerating control circuit, adapted to energize said operating coils successively in reverse order to that of the accelerating action and in opposition to the current passing through the holding coils to restore said magnets to normal position, and a switch operated by the return of each magnet to normal position to open the decelerating circuit through the operating coil of such magnet and close the decelerating circuit through the operating coil of the next magnet in order.

Signed by me at Boston, Massachusetts, this fourth day of April, 1912.

WILLIAM S. MITCHELL.

Witnesses:
ROBERT CUSHMAN,
CHARLES D. WOODBERRY.